United States Patent
Pannwitz et al.

(10) Patent No.: US 11,729,020 B2
(45) Date of Patent: Aug. 15, 2023

(54) TRANSMITTING/RECEIVING DEVICE FOR A BUS SYSTEM AND METHOD FOR REDUCING OSCILLATIONS OF A BUS DIFFERENTIAL VOLTAGE IN THE CASE OF COUPLED-IN INTERFERENCES

(71) Applicant: Robert Bosch GmbH, Stuttgart (DE)

(72) Inventors: Axel Pannwitz, Radebeul (DE); Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/775,939

(22) PCT Filed: Dec. 14, 2020

(86) PCT No.: PCT/EP2020/085903
§ 371 (c)(1),
(2) Date: May 11, 2022

(87) PCT Pub. No.: WO2021/122413
PCT Pub. Date: Jun. 24, 2021

(65) Prior Publication Data
US 2022/0417056 A1    Dec. 29, 2022

(30) Foreign Application Priority Data

Dec. 18, 2019 (DE) ...................... 10 2019 220 022.2

(51) Int. Cl.
*H04L 12/40* (2006.01)

(52) U.S. Cl.
CPC .. *H04L 12/40013* (2013.01); *H04L 12/40026* (2013.01); *H04L 12/40039* (2013.01); *H04L 2012/40215* (2013.01)

(58) Field of Classification Search
CPC ............... H04L 12/40; H04L 12/40013; H04L 12/40039; H04L 2012/40215
See application file for complete search history.

(56) References Cited

U.S. PATENT DOCUMENTS 10,454,705 B2 * 10/2019 Hartwich ............ H04L 25/0278
11,068,429 B2 *  7/2021 Brando ............. H04L 12/40013
(Continued)

FOREIGN PATENT DOCUMENTS

DE    102017213837 A1    2/2019
DE    102018202614 A1    8/2019

OTHER PUBLICATIONS

ISO 11898-1:2015, "Standard, Road Vehicles—Controller Area Network (CAN)—Part 1: Data Link Layer and Physical Signalling," 2015, pp. 1-74.
(Continued)

*Primary Examiner* — Henry Tsai
*Assistant Examiner* — Christopher A Daley
(74) *Attorney, Agent, or Firm* — Norton Rose Fulbright US LLP; Gerard Messina

(57) ABSTRACT

A transmitting/receiving device for a bus system and a method for reducing an oscillation tendency in the case of coupled-in interferences, in particular, in the transition between different bus states. The transmitting/receiving device has a transmitting stage for transmitting a transmit signal to a first bus wire of a bus of the bus system, and for transmitting the transmit signal to a second bus wire of the bus, and an oscillation reduction module for damping an oscillation of a bus signal arising at terminals for the bus wires when the transmitting/receiving device acts as the transmitter of the transmit signal. The oscillation reduction module includes a first resistor, which is switchable between the first bus wire and a terminal for ground, and the oscillation reduction module including a second resistor,
(Continued)

which is switchable between the second bus wire and a terminal for a voltage supply of the bus system.

12 Claims, 6 Drawing Sheets

(56) References Cited

U.S. PATENT DOCUMENTS

| | | | |
|---|---|---|---|
| 11,502,876 B2* | 11/2022 | Walker | H04L 12/4135 |
| 2016/0323287 A1 | 11/2016 | Kishikawa et al. | |
| 2018/0041240 A1 | 2/2018 | Tsuchiya et al. | |
| 2021/0026793 A1* | 1/2021 | Mutter | G06F 13/4086 |
| 2021/0409003 A1* | 12/2021 | Mueller | H04L 25/0272 |

OTHER PUBLICATIONS

International Search Report for PCT/EP2020/085903, dated Mar. 26, 2021.

* cited by examiner

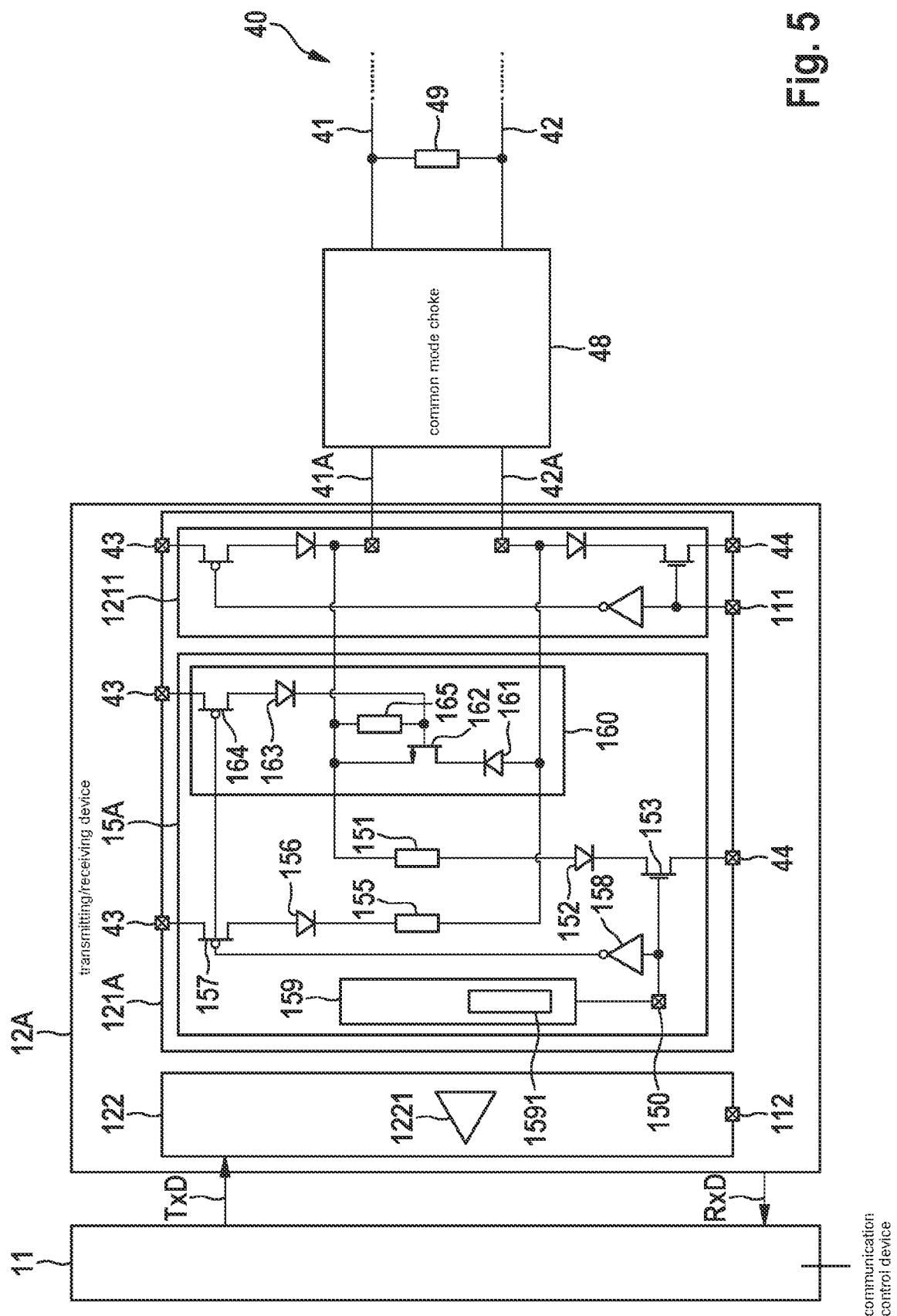

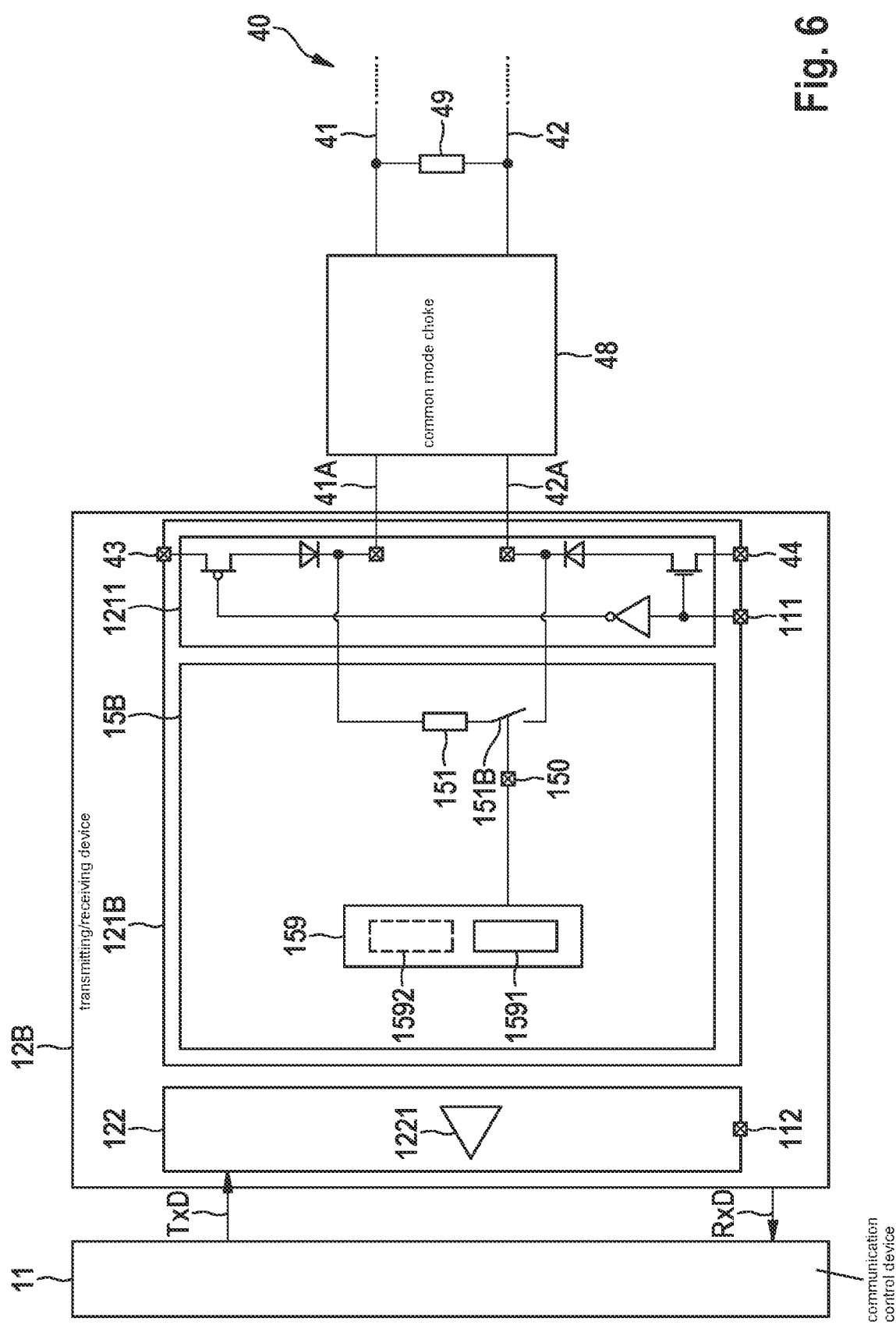

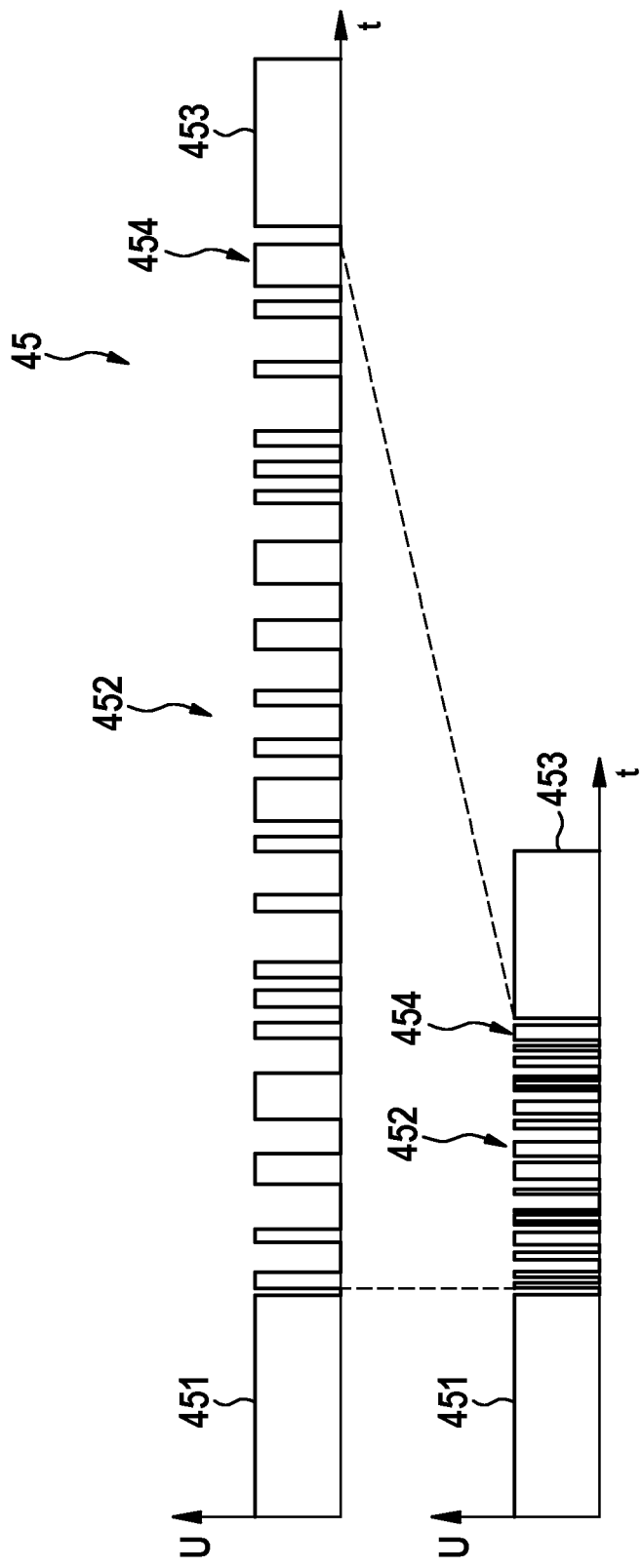

US 11,729,020 B2

TRANSMITTING/RECEIVING DEVICE FOR A BUS SYSTEM AND METHOD FOR REDUCING OSCILLATIONS OF A BUS DIFFERENTIAL VOLTAGE IN THE CASE OF COUPLED-IN INTERFERENCES

FIELD

The present invention relates to a transmitting/receiving device for a bus system and to a method for reducing oscillations of a bus differential voltage in the case of coupled-in interferences, in particular, in the transition between various bus states.

BACKGROUND INFORMATION

In a bus system, pieces of information or data, which are contained in bytes or bits, are transferred as messages via a bus between bus users. The pieces of information in this case are represented by different bit states or voltage states. The different bit states result in different bus states when the message is transferred via the bus of the bus system. Various transfer protocols exist for message transfer or data transfer depending on the bus system.

In the case of CAN bus systems, for example, messages are transferred with the aid of the CAN protocol and/or of the CAN FD protocol as it is described in the ISO-11898-1:2015 Standard as CAN Protocol Specification with CAN FD. The CAN bus system is widely used today for the communication between sensors and control units. The CAN bus system is often used in vehicles or in automation systems, etc., for a communication between the individual bus users.

In CAN and CAN FD, the conventional CSMA/CR method is used, which in a first phase for transferring a message allows simultaneous access of user stations of the bus system to the bus without a higher prioritized message being destroyed. For this purpose, the transmitting/receiving devices, which are also referred to as transceivers, must be in the position of being able to drive the bus in a low impedance manner. In this way, a dominant bus state or bit state is establishable as one of the two different bus states or bit states. In the recessive state, as the other state of the two different bus states, however, the transmitting/receiving devices are relatively high-impedance. The recessive state is overwritable by a dominant state.

This is utilized in order to negotiate in an arbitration phase, which of the user stations is allowed to transmit its message to the bus in a subsequent data phase. This ensures an exclusive, collision-free access to the bus in the data phase. Accordingly, the data transfer is very robust in both phases. As a result thereof, the frequency of erroneous data transfer drops significantly, which increases the speed of the data transfer in the bus system.

In order to be able to transfer data in the data phase at a higher bit rate than in CAN, an option has been created in the CAN FD message format for switching to a higher bit rate for the data phase. In such technologies, the maximum possible data rate is increased beyond a value of 1 Mbit/s by using a higher clocking in the area of the data fields. Such messages are also referred to below as CAN FD frames or as CAN FD messages. In the case of CAN FD, the payload data length of 8 bytes is expanded to up to 64 bytes and the data transfer rates are significantly higher than in the case of CAN.

The transition from dominant to recessive, depending on the bus topology, length of the stubs or stub lines, position and number of termination resistors, is subject to an oscillation tendency. This is very disadvantageous in terms of the system design, because the bit time must accordingly be long enough for the oscillation to be sufficiently dampened. If the bit time is not long enough, the transmitting/receiving device may erroneously recognize a dominant state in the recessive state.

The oscillation tendency may also be intensified by coupled-in high-frequency interferences. The high interference resistance to coupled-in high-frequency interferences is essential for the use of the CAN FD bus in the vehicle. For a transmitting/receiving device for a bus system, therefore, a predetermined interference resistance must be demonstrated by tests according to the IEC62228 Specification.

SUMMARY

It is an object of the present invention to provide a transmitting/receiving device for a bus system and a method for reducing oscillations of a bus differential voltage in the case of coupled-in interferences, which solve the aforementioned problems. A transmitting/receiving device for a bus system and a method for reducing oscillations of a bus differential voltage in the case of coupled-in interferences, in particular, an oscillation tendency in the transition from the dominant to the recessive state, in particular, is provided in a bus system.

The object may be achieved by a transmitting/receiving device for a bus system in accordance with the present invention. In accordance with an example embodiment of the present invention, the transmitting/receiving device includes a transmitting stage for transmitting a transmit signal to a first bus wire of a bus of the bus system, in which bus system an exclusive, collision-free access of a user station to the bus of the bus system is at least temporarily ensured, and for transmitting the transmit signal to a second bus wire of the bus, and an oscillation reduction module for damping an oscillation of a bus signal arising at terminals for the bus wires when the transmitting/receiving device acts as a transmitter of the transmit signal, the oscillation reduction module including a first resistor, which is switchable between the first bus wire and a terminal for ground, and the oscillation reduction module including a second resistor, which is switchable between the second bus wire and a terminal for a voltage supply of the bus system.

The aforementioned object may also achieved by a transmitting/receiving device for a bus system in accordance with the present invention. In accordance with an example embodiment of the present invention, the transmitting/receiving device includes a transmitting stage for transmitting a transmit signal to a first bus wire of a bus of the bus system, in which bus system an exclusive, collision-free access of a user station to the bus of the bus system is at least temporarily ensured, and for transmitting the transmit signal to a second bus wire of the bus, and an oscillation reduction module for damping an oscillation of a bus signal arising at terminals for the bus wires when the transmitting/receiving device acts as transmitter of the transmit signal, the oscillation reduction module including a resistor, which is switchable between the first bus wire and the second bus wire for damping the oscillation.

Each of the above-described transmitting/receiving devices is designed in such a way that coupled-in interferences are able to be recognized and dampened every time and not only in test methods. In the process, it is possible to positively counteract any coupled-in interferences such as, for example, interferences, which are caused by electrostatic discharge (ESD) during operation or by ISO pulses or broadcasters (BCI=broadcast interference), or interferences due to test methods such as DPI (direct power injection), etc.

With the described transmitting/receiving devices, a very favorable damping or reduction of oscillations is possible in each case in the transition from dominant to recessive. As a result, a safe reception is possible even at higher bit rates, which are used, in particular, in the data area of a message. As a result, the transfer rate or transfer speed of the messages in the bus system increases.

The described transmitting/receiving devices are also able to meet the interference resistance requirements of the IEC62228 specification even at transfer rates of, for example, 2 Mbit or 5 Mbit. At such transfer rates, the pulse edges at the transitions of the bus states are allowed to jitter much less than in the case of classical CAN, since the bit time at a transfer rate of 2 Mbit or 5 Mbit is shortened by a factor of 4 to 10 as compared to the classical CAN, which has a baud rate of 500 kbit/s.

A damping and thus a reduction of the oscillations in the transition between different bit states or voltage states, in particular in the CAN bus system from dominant to recessive, allows for more freedom in the design of bus topologies and/or of terminations and/or of stubs and/or of the number of nodes or user stations of the bus system.

In addition, an advantageous change in the spectrum in hardwired emission may achieved by an example embodiment of the transmitting/receiving devices of the present invention. The radiation of emissions may namely be reduced in the critical frequency range which is, for example, between approximately one and approximately 3 MHz, which corresponds to the resonance frequency of the common mode choke and parasitic capacitances. Instead, with the aid of the described transmitting/receiving devices the radiation of emissions occurs in the non-critical frequency range which, in the cited example, is at frequencies greater than approximately 10 MHz and at which the choke is active.

The transmitting/receiving devices are suitable for all communication systems, in which a bus state is actively driven as, in particular, in the case of a CAN bus system, a CAN HS bus system, a CAN FD bus system, etc. In a CAN HS bus system (HS=high speed), a data transfer rate of up to 500 kBit per second (500 kbps) is possible. In a CAN FD bus system, a data transfer rate of greater than 1 Mbit per second (1 Mbps) is possible.

Advantageous further embodiments of the respective transmitting/receiving device of the present invention are disclosed herein.

It is possible that the oscillation reduction module has a high-frequency detector for detecting high-frequency interference radiation and for ascertaining when the oscillation damping of the oscillation reduction module is to be switched on, so that the first resistor is switched between the first bus wire and the terminal for ground and the second resistor is switched between the second bus wire and the terminal for the voltage supply of the bus system, the high-frequency detector being designed to direct the oscillation reduction module to be switched on only after a transition from a dominant bus state to a recessive bus state, and the transmitting/receiving device being designed to generate the bus states in such a way that the dominant bus state is able to overwrite the recessive bus state.

In accordance with an example embodiment of the present invention, the transmitting/receiving device may also include a timer for switching off the oscillation reduction module after the expiration of a predetermined time period after the oscillation damping of the oscillation reduction module is switched on.

According to one exemplary embodiment of the present invention, transmitting/receiving device 12A also has a circuit for limiting a negative voltage value of a differential voltage on the bus in a transition of the differential voltage from a dominant bus state to a recessive bus state.

In one specific embodiment of the present invention, the transmitting/receiving device is designed for transmitting and receiving messages according to the CAN FD protocol.

The first and second resistor each potentially has a value of approximately 150 ohms or the resistor has a value of approximately 150 ohms.

The receiving stage of the transmitting/receiving device or the oscillation reduction module optionally also has a communication phase detection block for detecting different phases of a communication on the bus, the communication phase detection block being designed to switch on the oscillation damping of the oscillation reduction module as a function of the detection result of the communication phase detection block.

At least one of the above-described transmitting/receiving devices of the present invention may be part of a bus system, which includes a bus and at least two user stations connected to one another via the bus in such a way that they are able to communicate with one another. In this case, at least one of the at least two user stations includes an above-described transmitting/receiving device.

Of the at least two user stations, at least one user station may include a communication control unit, which is designed to transmit a signal to the transmitting/receiving device, which the transmitting/receiving device uses as a basis for the signal on the bus wires, and to compare the signal with a signal received from the bus by the transmitting/receiving device, and the communication control unit being designed to activate the oscillation reduction module on the basis of the comparison.

The aforementioned object may also achieved by a method for reducing oscillations of a bus differential voltage in the case of coupled-in interferences including the features of an example embodiment of the present invention. The method is carried out using a transmitting/receiving device for a bus system, in which an exclusive, collision-free access of a user station to a bus of the bus system is at least temporarily ensured, the method including the steps: transmitting, using a transmitting stage of the transmitting/receiving device, a transmit signal to a first bus wire of a bus of the bus system, transmitting, using the transmitting stage of the transmitting/receiving device, the transmit signal to a second bus wire of the bus, and damping, using an oscillation reduction module, an oscillation of a bus signal arising at terminals for the bus wires when the transmitting/receiving device acts as the transmitter of the transmit signal, a first resistor of the oscillation reduction module being switched between the first bus wire and a terminal for ground, and a second resistor of the oscillation reduction module being switched between the second bus wire and a terminal for a voltage supply of the bus system.

The aforementioned object may also achieved by a method for reducing oscillations of a bus differential voltage in the case of coupled-in interferences including the features of an example embodiment of the present invention. The method is carried out using a transmitting/receiving device for a bus system, in which an exclusive, collision-free access of a user station to a bus of the bus system is at least temporarily ensured, the method including the steps: transmitting, using a transmitting stage of the transmitting/receiving device, a transmit signal to a first bus wire of a bus of the bus system, transmitting, using the transmitting stage of the transmitting/receiving device, the transmit signal to a second bus wire of the bus, and damping, using an oscillation reduction module, an oscillation of a bus signal arising at terminals for the bus wires when the transmitting/receiving device acts as the transmitter of the transmit signal, a resistor of the oscillation reduction module being switched between the first bus wire and the second bus wire for damping the oscillation.

The method offers the same advantages as cited above with reference to the transmitting/receiving device.

Further possible implementations of the present invention also include combinations not explicitly mentioned of features or specific embodiments with respect to the exemplary embodiments described above or below. In this case, those skilled in the art will also add individual aspects as improvements on or additions to the respective basic form of the present invention, in view of the disclosure herein.

BRIEF DESCRIPTION OF THE DRAWINGS

The present invention is described in greater detail below with reference to the figures and based on exemplary embodiments.

FIG. 5 shows an electrical circuit diagram of a transmitting/receiving device of a bus system according to a second exemplary embodiment of the present invention.

FIG. 6 shows an electric circuit diagram of a transmitting/receiving device of a bus system according a third exemplary embodiment of the present invention.

FIG. 7 shows a diagram for illustrating the structure of a message, which is transmitted by a user station of the bus system according to the third exemplary embodiment of the present invention.

In the figures, identical or functionally identical elements are provided with the same reference numerals unless otherwise indicated.

DETAILED DESCRIPTION OF EXAMPLE EMBODIMENTS

Figure 1:
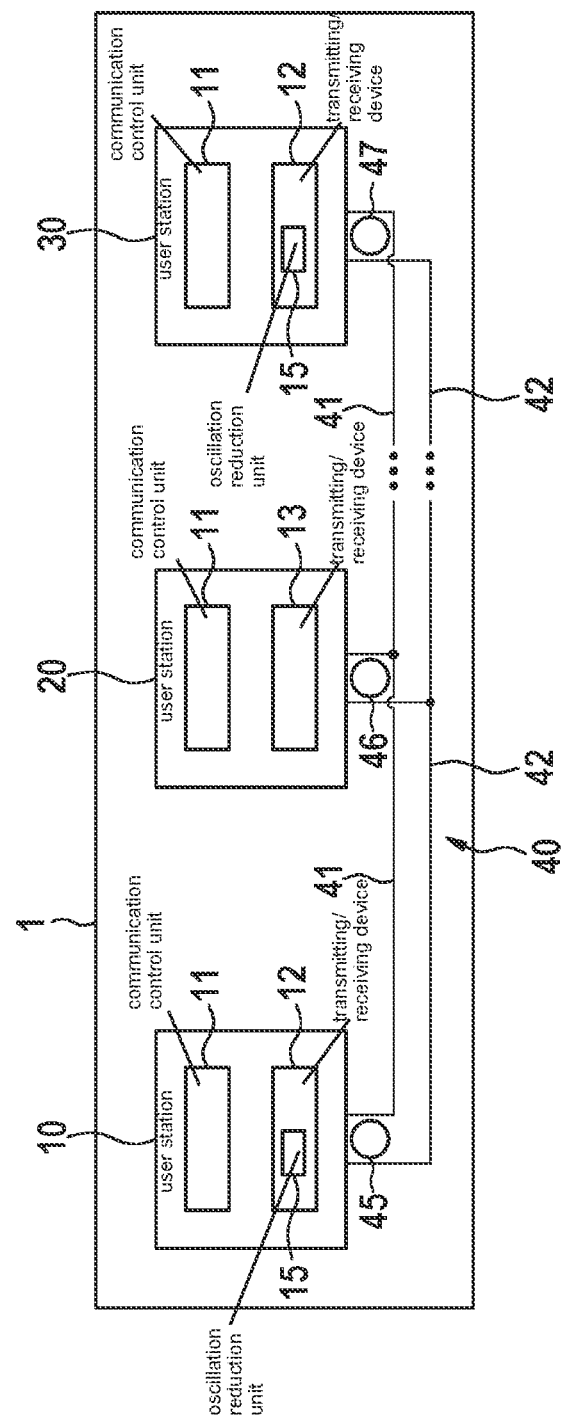
FIG. 1 shows a simplified block diagram of a bus system according to a first exemplary embodiment of the present invention.

FIG. 1 shows a bus system 1 which, for example, may be at least partially a CAN bus system, a CAN FD bus system, etc. Bus system 1 may be used in a vehicle, in particular, in a motor vehicle, in an aircraft, etc., or in the hospital, etc.

Bus system 1 in FIG. 1 has a plurality of user stations 10, 20, 30, each of which is connected at a bus 40 via a first bus wire 41 and a second bus wire 42. Bus wires 41, 42 may also be referred to as CAN_H and CAN_L and are used for the electrical signal transfer after coupling-in of the dominant level or generation of recessive levels for a signal in the transmitting state. Messages 45, 46, 47 are transferable via bus 40 in the form of signals between individual user stations 10, 20, 30. User stations 10, 20, 30 are control units or display devices of a motor vehicle, for example.

As shown in FIG. 1, user stations 10, 30 each have a communication control unit 11 and a transmitting/receiving device 12. Transmitting/receiving devices 12 each include an oscillation reduction module 15. In contrast, user station 20 has a communication control unit 11 and a transmitting/receiving device 13. Transmitting/receiving devices 12 of user stations 10, 30 and transmitting/receiving device 13 of user station 20 are each directly connected at bus 40, even though this is not shown in FIG. 1.

Communication control unit 11 is used for controlling a communication of respective user stations 10, 20, 30 via bus 40 with one other user station of user stations 10, 20, 30 connected at bus 40. Transmitting/receiving unit 12 is used to transmit messages 45, 47 in the form of signals and utilizes oscillation reduction module 15 in the process, as is described later in greater detail. Communication control unit 11 may be designed, in particular, as a conventional CAN FD controller and/or CAN controller. Transmitting/receiving device 13 may be designed, in particular, as a conventional CAN transceiver and/or CAN FD transceiver. Transmitting/receiving device 13 may be designed, in particular, as a conventional CAN transceiver.

Figure 2:
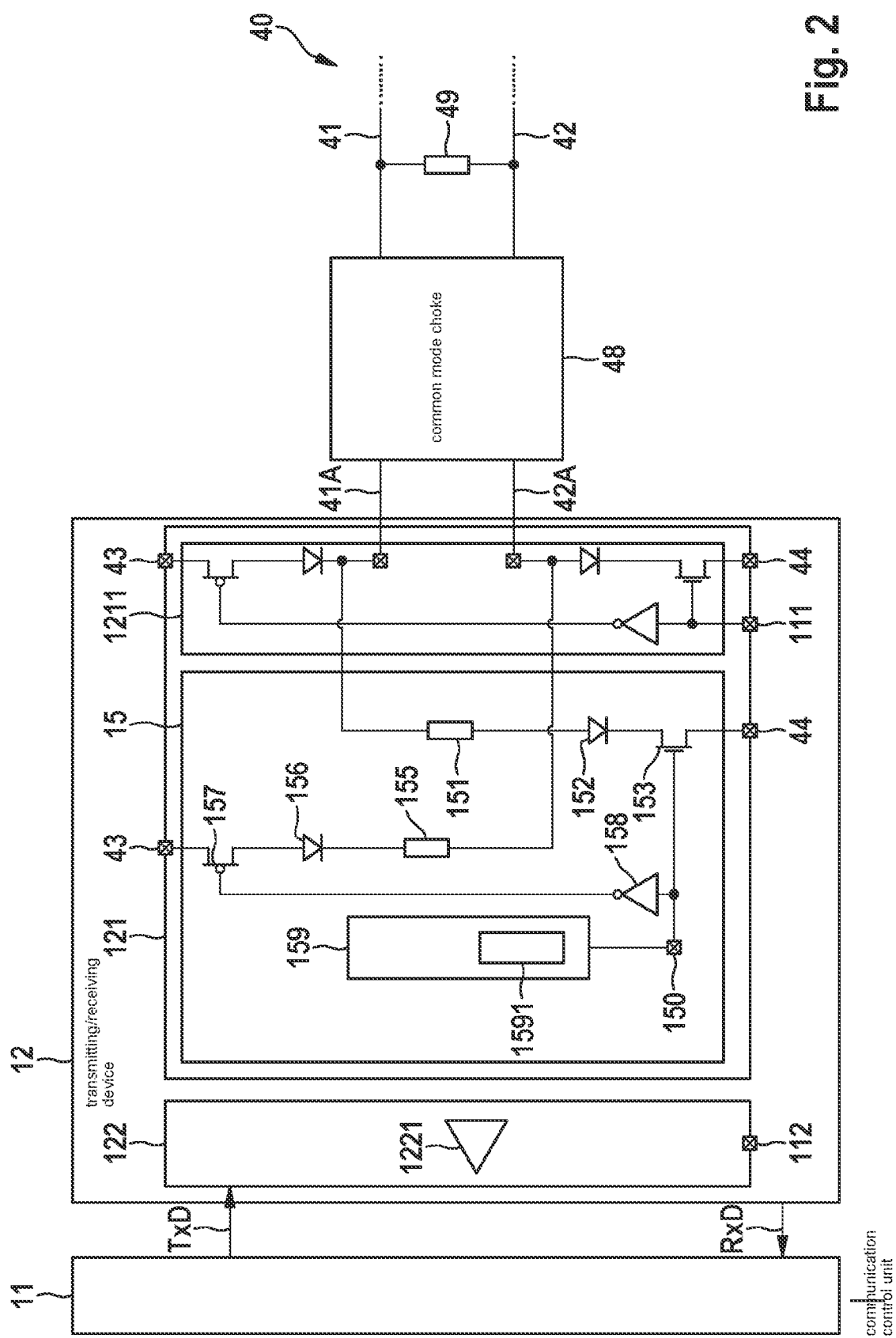
FIG. 2 shows an electric circuit diagram of a transmitting/receiving device of the bus system according to the first exemplary embodiment of the present invention.

FIG. 2 shows the basic structure of transmitting/receiving device 12 including oscillation reduction module 15. Transmitting/receiving device 12 is connected with terminals 41A, 42A at bus 40, more precisely at its first bus wire 41 for CAN_H and at its second bus wire 42 for CAN_L. The voltage supply, in particular, CAN supply, for first and second bus wire 41, 42 takes place via a terminal 43. The connection to ground or CAN_GND is implemented via a terminal 44. A common mode choke 48 is connected between terminals 41A, 42A and first and second bus wire 41, 42. Common mode choke 48 effectuates, in particular, a reduction of the radiation of high-frequency energy and interferences of the radio reception by bus 40. First and second bus wire 41, 42 are terminated with a termination resistor 49.

First and second bus wire 41, 42 are connected in transmitting/receiving device 12 to a transmitting stage 121, which is also referred to as a transmitter. In addition, in transmitting/receiving device 12 first and second bus wire 41, 42 are also connected to a receiving stage 122, which is also referred to as a receiver. For this purpose, receiving stage 122, as is traditionally customary, has a receiving comparator 1221, which is connected to bus 40, even though, for the sake of simplicity, this is not shown in FIG. 2.

The exact switch-on for driving a digital transmit signal TxD by communication control unit 11 via a terminal 111 takes place as is traditionally customary. The switch-on for driving a received signal RxD via a terminal 112 to communication control unit 11 also takes place as traditionally customary. Thus, for the sake of simplicity, this switch-on is not shown in FIG. 2. Digital received signal RxD has been generated from the signal received from bus wires 41, 42 using receiving stage 122.

According to FIG. 2, transmitting stage 121 has a conventional driver 1211 for the signals for first and second bus wire 41, 42. In addition, oscillation reduction module 15 is installed in or connected at transmitting stage 121. The functionality of oscillation reduction module 15 in transmitting/receiving device 12 is active only when transmitting/receiving device 12 itself transmits or acts as a transmitter. To determine whether transmitting/receiving device 12 is acting as a transmitter, the evaluation of transmit signal TxD may, in particular, be carried out.

Oscillation reduction module 15 includes a terminal 150 for switching on or switching off oscillation reduction module 15. In addition, oscillation reduction module 15 has a first resistor 151, a first diode 152, which may be a first drain bulk diode of a MOSFET of the semiconductor substrate of transmitting stage 121, and a first transistor 153 as a switch for first bus wire 41. Module 15 also has a second resistor 155, a second diode 156, which may be a second drain bulk diode of a MOSFET of the semiconductor substrate of transmitting stage 121, and a second transistor 157 as a switch for second bus wire 42. In addition, oscillation reduction module 15 has an inverter 158 and a high-frequency detector 159, whose output is connected at terminal 150. The input of high-frequency detector 159 is connected to bus 40, even though, for simplifying the figure, this is not shown in FIG. 2. The output of high frequency detector 159 is connected to the control terminal of transistor 153.

More precisely, oscillation reduction module 15 includes for first bus wire 41 a first resistor 151, a first diode 152, and a first transistor 153, which are connected in series in the aforementioned order. Oscillation reduction module 15 also includes for second bus wire 42 a second resistor 155, a second diode 156, and a second transistor 157, which are connected in series in the aforementioned order.

First resistor 151 is connected at its one end to first bus wire 41, i.e., in the present exemplary embodiment, to CAN-H. One end of transistor 153 is connected via terminal 44 to ground or CAN_GND. Transistor 153 may, for example, be designed as a metal insulator field effect transistor. Transistor 153 is, in particular, a metal oxide field effect transistor (MOSFET) or is designed as a field effect transistor including an insulated gate, which is also referred to as IGFET.

Second resistor 155 is connected at its one end to bus wire 42, i.e., in the present exemplary embodiment, to CAN_L. One end of transistor 157 is connected via terminal 43 to the voltage supply for bus 40 or for CAN. Transistor 157 may, for example, be designed as a metal insulator field effect transistor. Transistor 157 is, in particular, a metal oxide field effect transistor (MOSFET) or is designed as a field effect transistor including an insulated gate (IGFET).

Thus, a resistor 151 is connected from CAN_H or from first bus wire 41 to ground and a resistor 155 is connected from CAN_L or second bus wire 42 in the direction of the voltage supply, which in CAN is usually 5 V.

Resistors 151, 155 with their resistance value R effectuate a damping of the oscillation tendency of the signals, as explained in greater detail below with reference to FIG. 3 and FIG. 4.

During the operation of bus system 1, high-frequency detector 159 of FIG. 2 detects high-frequency interferences on bus 40. High-frequency interferences in this context are understood to mean signals with frequencies whose period duration is shorter than a bit time duration $T_{B\_402}$ or $T_{B\_401}$ according to FIG. 3 or FIG. 4, or is in a range of approximately 5 MHz to approximately 50 MHz. High-frequency detector 159 may include at least one filter for this purpose, in particular, a high pass and/or a deep pass and/or a band pass. High-frequency detector 159 includes a timer 1591, which enables a switch-on of oscillation reduction module 15 via terminal 150 and thus a damping of bus 40 only for a short time period $T_D$ after the dominant recessive edge, as shown in FIG. 3 or FIG. 4. Time period $T_D$ is not greater than 100 ns. This ensures that other user stations 20, 30 are able to continue to communicate.

Figure 3:
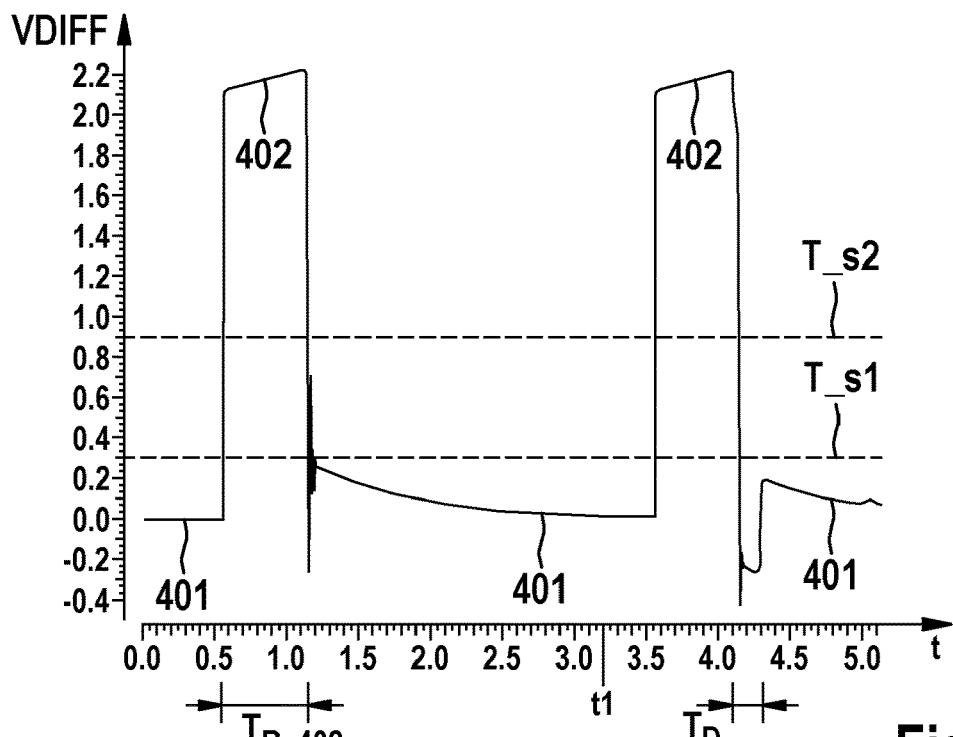
FIG. 3 shows a temporal profile of a differential voltage VDIFF of the bus signals CAN_H and CAN_L in the transmitting/receiving device of FIG. 2 when no high-frequency interference occurs, the oscillation reduction module being switched on only before the second change from the recessive bus state to the dominant bus state.
Figure 4:
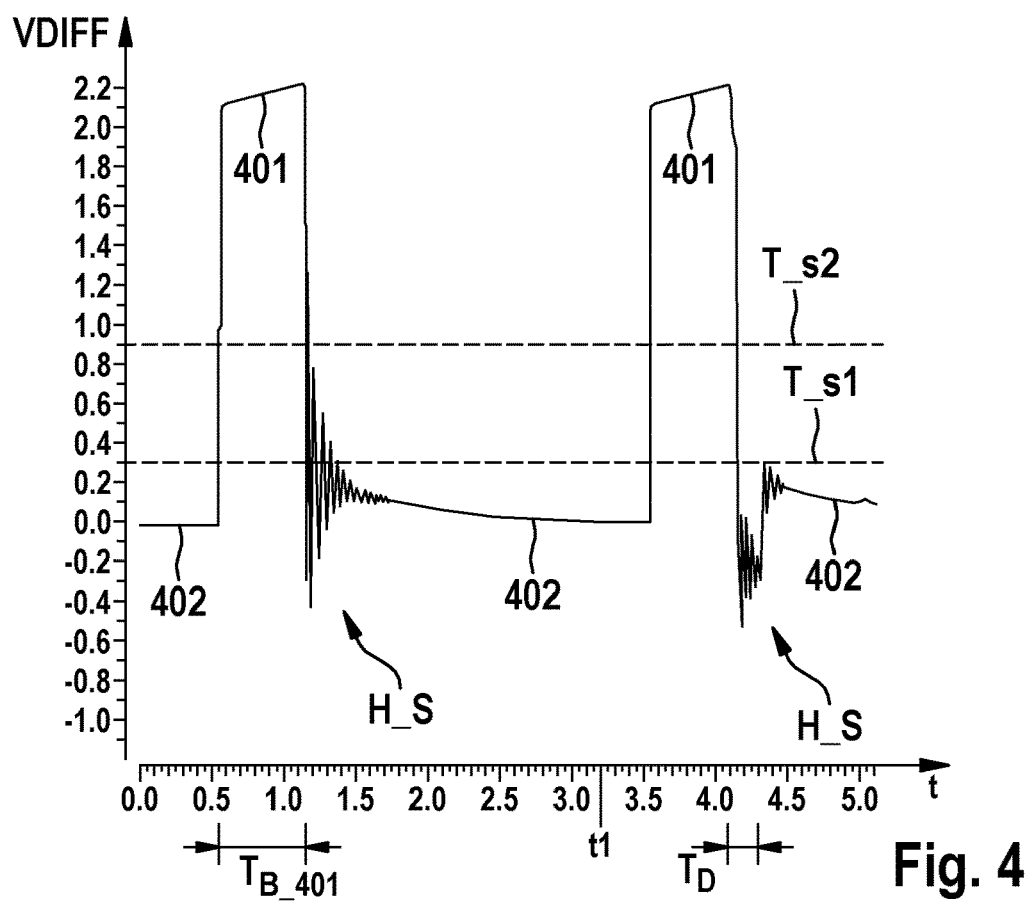
FIG. 4 shows a temporal profile of a differential voltage VDIFF of the bus signals CAN_H and CAN_L in the transmitting/receiving device of FIG. 2 when a high-frequency interference occurs, the oscillation reduction module being switched on only before the second change from the recessive bus state to the dominant bus state.

As a result of the above-described structure, oscillation reduction module 15 has the advantage that module 15 is able to lower the bus voltage not only to 0 V, but that the bus voltage even becomes negative due to module 15, as is indicated from FIG. 3 and FIG. 4. This further increases the interference resistance of transmitting/receiving device 12 and thus yields an additional advantage.

FIG. 3 shows a temporal profile of a differential voltage VDIFF=CAN_H−CAN_L between bus wires 41, 42 or 41A, 41B in transmitting/receiving device 12 according to the present exemplary embodiment. The signal of FIG. 3 arises as a result of a transmit signal TxD, which has been transmitted from one of user stations 10, 20, 30 to bus 40. No high-frequency interference radiation is present in the example of FIG. 3. The signal of FIG. 3 arises when oscillation reduction module 15 is initially switched off and switched on only after a point in time t1.

In the case of differential voltage VDIFF of FIG. 3, two state changes from a first bus state 401 to a second bus state 402 and then back again to first bus state 401 take place in succession over the course of time t. In this case, second bus state 402 in the example of FIG. 3 takes in each case only one bit of transmit signal TxD, a bit time duration $T_{B\_402}$ for second bus state 402 arising in the signal of FIG. 3. First bus state 401 may also be referred to as the recessive state or higher level of signals CAN_H, CAN_L. Second bus state 402 may also be referred to as the dominant state or lower level of signals CAN_H, CAN_L.

Bit time period $T_{B\_402}$ for a dominant bus state 402 should ideally be the same as a bit time period $T_{B\_401}$ for a recessive bus state 401. If differential voltage VDIFF of FIG. 3 at a sampling point of the bus state is below a reception threshold T_s1 of receiving stage 122, receiving stage 122 recognizes the bus state as recessive bus state 401. In the example of FIG. 3, reception threshold T_s1 is at 0.3 V. If differential voltage VDIFF of FIG. 3 at a sampling point of the bus state is above a reception threshold T_s2 of receiving stage 122, receiving stage 122 recognizes the bus state as dominant bus state 402.

According to FIG. 3, differential voltage VDIFF on the left-hand side of FIG. 3, i.e., prior to point in time t1, has a significantly greater overshoot in the transition from state 402 to state 401 than on the right-hand side of FIG. 3, i.e. after point in time t1. Oscillation reduction module 15, which has been switched on at point in time T1, thus effectuates a significant damping of the overshoot in the transition from state 402 to state 401. In this case, resistors 151, 155 of oscillation reduction module 15 are dimensioned in such a way that a negative differential voltage VDIFF of up to −0.5 V occurs in the transition from state 402 to state 401. For this purpose, resistors 151, 155 have approximately a value of 150 ohms. Other values for resistors 151, 155 are of course also selectable.

By comparison, FIG. 4 shows a temporal profile of a differential voltage VDIFF=CAN_H−CAN_L between bus wires 41, 42 in transmitting/receiving device 12 according to the present exemplary embodiment when high-frequency interference radiation H_S is present. The signal of FIG. 4 arises when oscillation reduction module 15 is initially switched off and is switched on only after point in time t1, as in the example of FIG. 3.

As shown in the left-hand portion of FIG. 4, differential voltage VDIFF of FIG. 4 is above reception threshold T_s1 of receiving stage 122 for a significantly longer period of time directly after the transition from state 402 to state 401 due to interference radiation H_S. Thus, differential voltage VDIFF on the left-hand side of FIG. 4, i.e., prior to point in time t1, at which oscillation reduction module 15 is switched on, has a significantly greater overshoot after the transition from state 402 to state 401 than on the right-hand side of FIG. 4, i.e., after point in time t1.

Oscillation reduction module 15 thus effectuates a significant damping of the overshoot in the transition from state 402 to state 401 even in the case of interference radiation H_S. As a result of the dimensioning of resistors 151, 155 of oscillation reduction module 15, as in the example of FIG. 3, a negative differential voltage VDIFF of up to approximately –0.6 V occurs in the transition from state 402 to state 401.

As a result, oscillation reduction module 15 is able to significantly increase the interference resistance of transmitting/receiving device 12 according to the present exemplary embodiment. Thus, in the case of superposed high-frequency interference, mostly usual dominant reception threshold T_s2 of 0.9 V cannot be erroneously exceeded. This applies also when threshold value voltage or reception threshold T_s1 of receiving stage 122 is set to the usual value of T_s1=0.5 V for the assessment of a bus state as recessive bus state 401 or even to a value of T_s1=0.3 V as illustrated in FIG. 3 and FIG. 4. In such cases, receiving stage 122 no longer ignores any state change from state 401 to state 402 or from recessive to dominant even in the case of a state change from state 402 to state 401 or from dominant to recessive.

Thus, a sampling of differential voltage VDIFF for generating received signal RxD at the currently usual sampling point $AP = x \cdot T_{B\_402}$ reliably produces the desired result. This applies also when the length of bit time $T_{B\_402}$ of state 402 or of a dominant bit should be extended somewhat with respect to a conventional transmitting/receiving device or to transmitting/receiving device 13 of user station 20, as is apparent from FIG. 3 and FIG. 4. To establish the sampling point, it means that x is in particular approximately equal to 0.75. Alternatively, the transmitting/receiving device may ascertain the value for x during the operation of bus system 1 in the arbitration phase (lower bit rate), in order to adapt the sampling point of the bits for the following data phase (higher bit rate=faster data transfer) to the currently applicable operating conditions.

Thus, transmitting/receiving device 12 according to the present exemplary embodiment has, not only in the case of high-frequency interference radiation H_S, a lower oscillation tendency than a conventional transmitting/receiving device or transmitting/receiving device 13.

Thus, transmitting/receiving device 12 is used to carry out a method for reducing an oscillation tendency in the transition between different bus states. The oscillation due to a transition between different bus states is significantly dampened and thus reduced using oscillation reduction module 15.

In the described exemplary embodiment, only user stations 10, 30 have the functionality of transmitting/receiving device 12. User stations 10, 30 are preferably user stations or nodes having a higher oscillation tendency and/or user stations or nodes in which a high interference resistance against high-frequency radiation H_S is required. The high oscillation tendency of user stations 10, 30 may result, in particular, due to their position in bus system 1, to the position of termination resistors 49, to the stub length to user stations 10, 30, etc.

In addition, described transmitting/receiving device 12 also allows for the use of bulk silicon technologies. In such technologies, the dominant-to-recessive edge of differential signal VDIFF may be held temporally stable due to the construction of transmitting/receiving device 12 itself, even at high interference levels of radiation H_S that occur during the engagement of ESD structures, such as choke 48.

Transmitting/receiving device 12 prevents a de-energization of the polarity protection diodes in CAN FD transmitting stage 121 from causing abrupt current breaks, which then prompts choke 48 with its parasitic capacitances to oscillate. These oscillations would result in a high jitter of the dominant-to-recessive edge at the output of receiving stage 122. In this case, receiving stage 122 would potentially recognize even a short dominant peak or dominant spike, also resulting in an error and thus in lower interference resistance.

According to one modification of the first exemplary embodiment, user station 20 also has, instead of a transmitting/receiving device 13, a transmitting/receiving device 12. In this case the above-described functionality of transmitting/receiving device 12 is active, in particular, as needed, for all user stations 10, 20, 30 of the bus system.

FIG. 5 shows the basic structure of a transmitting/receiving device 12A, which includes a transmitting stage 121A and an oscillation reduction module 15A according to a second exemplary embodiment. Except for the following described differences, bus system 1 and transmitting/receiving device 12A are structured in the same manner as described above for bus system 1 and for transmitting/receiving device 12 according to the preceding exemplary embodiment or its modifications.

Oscillation reduction module 15A also has a circuit block 160, which implements a switchable voltage limit of differential voltage VDIFF in the transition from state 402 to state 401. The switchable voltage limit of differential voltage VDIFF is, in particular, a negative differential voltage VDIFF=–0.6V.

In this variant, resistors 151, 155 are less than 150 ohms, for example, 50 ohms. Differential voltage VDIFF on bus 40 is limited to –0.6V in the transition from state 402 to state 401 during the damping process with the aid of a switchable diode 161. Diode 161 is switchable with the aid of a switch 162, which may be designed as a transistor. Transistor or switch 162 may be designed as one of the transistors mentioned above with respect to the first exemplary embodiment. Switch 162 is connected in series to diode 161. In addition, a polarity protection diode 163 and a switch 164 are present in the direction of terminal 43 for the voltage supply. Switch 164 is designable as a transistor in the manner as mentioned above with respect to the first exemplary embodiment. A resistor 165 is connected between the gate terminal and source terminal of switch 162.

To activate switch 162, PMOS switch 164 or PMOS transistor 164 opens so that electric current flows through diode 163. The electric current from diode 163 generates a positive gate source voltage at NMOS switch 162 via gate source resistor 165, which opens NMOS switch 162 and clamps VDIFF=CAN_H–CAN_L onto the forward voltage of diode 161. The forward voltage of diode 161 is, in particular, approximately 0.6 V. The control current from transistor 164 then drains via resistor 151 and polarity protection diode 152 and NMOS transistor 153 to CAN_GND. In this case, the control current for switch 164 is set in such a way that the common mode level of 2.5 V is set on bus 40 via the series connection made up of 151, 152, 153. Gate source resistor 165 is selected in such a way that the maximum possible gate source voltage is formed in just this way via switch 162. The resistance value of resistor 155 is thus selected to be somewhat greater than the resistance value of resistor 151. The electric current through resistor 155 will be smaller than the current through resistor 151 by exactly the amount of control current through 164, 163 and resistor 165 via the gate terminal and source terminal of switch 162.

Circuit 160 has the advantage that in the case of the signals of FIG. 3 and FIG. 4, recessive bus state 401 is achieved even more quickly. In addition, described transmitting/receiving device 12B also allows for the use of bulk silicon technologies. A disadvantage of circuit 160, however, is that switch 162 must be activated and that polarity protection diode 163 must be taken into account.

FIG. 6 shows the basic structure of a transmitting/receiving device 12B, which includes a transmitting stage 121B and an oscillation reduction module 15B according to a second exemplary embodiment. Except for the differences described below, bus system 1 and transmitting/receiving device 12B are structured in the same manner as described above for bus system 1 and transmitting/receiving device 12 according to the preceding exemplary embodiment or its modifications.

Instead of two resistors 151, 155 and their interconnection, oscillation reduction module 15B has only one resistor 151, which is switchable using a switch 151B. Resistor 151 is connected in series to switch 151B. The series connection made up of resistor 151 and switch 151B is connected between bus wires 41, 42. A damping of the oscillations during a transition from state 402 to state 401 may also be achieved in this manner.

Oscillation reduction module 15B is less suited for a transmitting/receiving device 12B that uses the bulk silicon technologies. The reason therefor is that a parasitic diode is always formed in the substrate of transmitting/receiving device 12B which, in turn, results in rectifying effects in the case of high-frequency interference radiation.

High-frequency detector 159 optionally has an only schematically illustrated communication phase detection block 1592, which is connected upstream from timer 1591. Due to block 1592, switch 151B is able to be actuated as a function of the different phases of a communication on bus 40. In this case, communication phase detection block 1592 is only able to release timer 1591 or only able to switch the damping of oscillation reduction module 15B on or off when the data phase of a message 45, 46, 47 is present.

The different phases of a communication may be detected and recognized or differentiated by communication phase detection block 1592, as described in greater detail with reference to FIG. 7. Communication phase detection block 1592 may instead be part of receiving stage 122 or part of oscillation reduction module 15B.

Communication phase detection block 1592 may, for example, include a differential amplifier, whose inputs are connected in parallel to the inputs of reception comparator 1221 of receiving stage 122. At least one output of detection block 1592 is usable for activating switch 151B.

FIG. 7 shows in its upper portion with reference to message 45 a CAN frame as it is transmitted by transmitting/receiving device 12, 12A, 12B or by transmitting/receiving device 13, and in its lower portion a CAN FD frame as it may be transmitted by transmitting/receiving device 12, 12A, 12B. The CAN frame and the CAN FD frame are subdivided for the CAN communication on bus 40 basically into two different communication phases, namely arbitration phase 451, 453 and a data area 452 which, in CAN HS, is also referred to as a data field or in CAN FD also as a data phase. Data area 452 is closed at its end with at least one end bit 454, which is also referred to as an EOF bit, EOF standing for end of frame or end of the message. In the case of CAN or CAN FD, the EOF is a bit sequence made up of 11 recessive bits, i.e., bits with second bus state 402.

In the case of CAN FD, the bit rate for the following data phase is increased, for example, to 2, 4, 8 Mbit per second (Mpbs) at the end of arbitration phase 451 as compared to the classical CAN. This means that in the case of CAN FD, the bit rate in arbitration phases 451, 453 is lower than the bit rate in data area 452. In the case of CAN FD, data area 452 is shortened significantly compared to data area 452 of the CAN frame.

Arbitration phases 451, 453 are an important component of a CAN frame and of a CAN FD frame or of messages 45, 46, 47, which are shown in FIG. 1. In this case, it is decided which nodes or which user stations 10, 20, 30 of bus system 1 carries the most important message 45, 46, 47. User station 10, 20, 30 having the most important message 45, 46, 47 wins the arbitration and is therefore allowed to transmit the message upon completion of the arbitration phase. All other user stations are then listeners, i.e., only receivers, during the transferring of this most important message.

Communication phase detection block 1592 is able to recognize arbitration phases 451, 453, data area 452 as well as the end of data area 453, i.e., end bit (EOF) 454. As a result, the functionality of oscillation reduction module 15B may apply, as desired, either for all communication phases 451 through 453 or for phases/areas of a message 45 or when arbitration is completed, i.e. for data area 452. The latter is meaningful if otherwise too many user stations 10, 20, 30 are able to simultaneously activate the function of the transmitting/receiving device 12B during arbitration and thus reduce too drastically the effective bus resistance.

According to a fourth exemplary embodiment, it is possible that communication control unit 11 of one of transmitting/receiving devices 12, 12A, 12B of the preceding exemplary embodiment transmits a control signal in order to activate the damping of modules 15, 15A, 15B. In this case, communication control unit 11 would have to include, in addition to terminals 111, 112 for signals TxD, RxD, an additional terminal for a control signal.

To generate the control signal, communication control unit 11 is able to monitor the bus traffic on bus wires 41, 42 by communication control unit 11 comparing transmit signal TxD transmitted at terminal 111 and, received signal RxD received and, if necessary, buffered, at terminal 112 with one another. If, in the recessive bus state, i.e., in first bus state 401, deviations between the two signals TxD, RxD occur such as, for example, state changes in received signal RxD, which were not contained in transmit signal TxD, conclusions may then be drawn about the network or about bus 40 and about the signal integrity.

In addition, communication control unit 11 may also use pieces of information, such as bit rate, propagation delay for both switching processes, i.e., a state change from first bus state 401 to second bus state 402, in order to generate the control signal. The pieces of information may be held in a block (not shown), in particular, in a memory.

In this way, the control of the reduction of the oscillation tendency (ringing suppression) is not controlled by transmitting/receiving device 12, 12A, 12B connected to unit 11, but by communication control unit 11. In this case, communication control unit 11 is able to adapt oscillation reduction module 15, 15A, 15B to the specific characteristics of user station 10 and of the network or of bus 40. In other words, communication control unit 11 is able to set oscillation reduction module 15, 15A, 15B in a node-sensitive or network-sensitive manner. Communication control unit 11 thus provides a learning function for user station 10.

Thus, a significant reduction of the oscillation tendency may also be implemented in the state change from second bus state 402 to first bus state 401. A significant benefit for bus system 1 as a total system may also be achieved as a result.

All above-described embodiments of oscillation reduction module 15, 15A, 15B, of transmitting/receiving devices 12, 12A, 12B, of user stations 10, 20, 30, of bus system 1, and of the method carried out therein according to the exemplary embodiments and their modifications may be used individually or in all possible combinations. The following modifications, in particular, are also possible.

Communication phase detection block 1592 and the functionality of oscillation reduction module 15B associated therewith are, in particular, usable in each of the exemplary embodiments and their modifications.

The above-described bus system 1 according to the exemplary embodiments and/or their modifications is described with reference to a bus system based on the CAN protocol. Bus system 1 according to the exemplary embodiments and/or their modifications may, however, also be a different type of communication network. It is advantageous, but not a necessary prerequisite, that in bus system 1 an exclusive, collision-free access of a user station 10, 20, 30 to bus line 40 or to a shared channel of bus line 40 is ensured, at least for particular time spans.

Bus system 1 according to the exemplary embodiments and/or their modifications is, in particular, a CAN network or a CAN HS network or a CAN FD network or a FlexRay network. Bus system 1 may, however, also be another serial communication network.

Oscillation reduction module 15, 15A, 15B may be used, in particular, in LVDS (low voltage differential signaling), which is an interface standard for a high-speed data transfer, in which a transmitter and a receiver are connected to one another via a data transfer path. LVDS is standardized according to ANSI/TIA/EIA-644-1995.

The number and arrangement of user stations 10, 20, 30 in bus system 1 according to the exemplary embodiments and/or their modifications is arbitrary. Only user station 10 or user stations 30, in particular, may be present in bus systems 1 of the exemplary embodiments and/or of their modifications.

The functionality of the above-described exemplary embodiments and/or their modifications may be implemented in each case in a transceiver or in a transmitting/receiving device 12, 12A, 12B or in a transceiver or CAN transceiver or in a transceiver chip set or CAN transceiver chip set, etc. In addition or alternatively, it may be integrated into existing products. It is possible, in particular, that the considered functionality is implemented either in the transceiver as a separate electronic component (chip) or is embedded in an integrated total solution, in which only one electronic component (chip) is present.

What is claimed is:

1. A transmitting/receiving device for a bus system, comprising:
    a transmitting stage configured to transmit a transmit signal to a first bus wire of a bus of the bus system, in which bus system an exclusive, collision-free access of a user station to the bus of the bus system is at least temporarily ensured, and the transmitting stage being configured transmit the transmit signal to a second bus wire of the bus; and
    an oscillation reduction module configured to damp an oscillation of a bus signal arising at terminals for the first and second bus wires when the transmitting/receiving device acts as a transmitter of the transmit signal, the oscillation reduction module including a first resistor, which is switchable between the first bus wire and a terminal for ground, and the oscillation reduction module including a second resistor, which is switchable between the second bus wire and a terminal for a voltage supply of the bus system.

2. A transmitting/receiving device for a bus system, comprising:
    a transmitting stage configured to transmit a transmit signal to a first bus wire of a bus of the bus system, in which bus system an exclusive, collision-free access of a user station to the bus of the bus system is at least temporarily ensured, and the transmitting stage configured to transmit the transmit signal to a second bus wire of the bus; and
    an oscillation reduction module configured to damp an oscillation of a bus signal arising at terminals for the bus wires when the transmitting/receiving device acts as a transmitter of the transmit signal, the oscillation reduction module including a first resistor which is switchable between the first bus wire and the second bus wire for damping the oscillation.

3. The transmitting/receiving device as recited in claim 1, wherein the oscillation reduction module includes a high-frequency detector configured to detect high-frequency interference radiation and to ascertain when the oscillation damping of the oscillation reduction module is to be switched on, so that the first resistor is switched between the first bus wire and the terminal for ground, and the second resistor is switched between the second bus wire and the terminal for the voltage supply of the bus system, the high-frequency detector being designed to direct the oscillation reduction module to be switched on only after a transition from a dominant bus state to a recessive bus state, and wherein the transmitting/receiving device is configured to generate the dominate and recessive bus states in such a way that the dominant bus state is able to overwrite the recessive bus state.

4. The transmitting/receiving device as recited in claim 1, further comprising:
    a timer configured to switching off the oscillation reduction module after expiration of a predetermined time period after the oscillation damping of the oscillation reduction module is switched on.

5. The transmitting/receiving device as recited in claim 1, further comprising:
    a circuit configured to limit a negative voltage value of a differential voltage on the bus during a transition of the differential voltage from the dominant bus state to the recessive bus state.

6. The transmitting/receiving device as recited in claim 1, wherein the transmitting/receiving device is configured to transmit and receive messages according to a CAN FD protocol.

7. The transmitting/receiving device as recited in claim 1, wherein the first and second resistor each have a value of approximately 150 ohms, or the first resistor has a value of approximately 150 ohms.

8. The transmitting/receiving device as recited in claim 1, wherein a receiving stage of the transmitting/receiving device or the oscillation reduction module includes a communication phase detection block for detecting different phases of a communication on the bus, and the communication phase detection block is configured to switch on the oscillation damping of the oscillation reduction module a function of a detection result of the communication phase detection block.

9. A bus system, comprising:
a bus; and
at least two user stations connected to one another via the bus in such a way that they are able to communicate with one another, wherein at least one of the at least two user stations includes a transmitting/receiving device, including:
a transmitting stage configured to transmit a transmit signal to a first bus wire of the bus of the bus system, in which bus system an exclusive, collision-free access of a user station to the bus of the bus system is at least temporarily ensured, and the transmitting stage being configured transmit the transmit signal to a second bus wire of the bus, and
an oscillation reduction module configured to damp an oscillation of a bus signal arising at terminals for the first and second bus wires when the transmitting/receiving device acts as a transmitter of the transmit signal, the oscillation reduction module including a first resistor, which is switchable between the first bus wire and a terminal for ground, and the oscillation reduction module including a second resistor, which is switchable between the second bus wire and a terminal for a voltage supply of the bus system.

10. The bus system as recited in claim 9, wherein one of the at least two user stations includes a communication control unit, which is configured to transmit a signal to the transmitting/receiving device, which the transmitting/receiving device uses as a basis for the transmit signal on the first and second bus wires, and to compare the signal with a signal received from the bus by the transmitting/receiving device, and the communication control unit being configured to activate the oscillation reduction module based on the comparison.

11. A method for reducing oscillations of a bus differential voltage in a case of coupled-in interferences, the method being carried out using a transmitting/receiving device for a bus system, in which an exclusive, collision-free access of a user station to a bus of the bus system is at least temporarily ensured, the method comprising the following steps:

transmitting, using a transmitting stage of the transmitting/receiving device, a transmit signal to a first bus wire of the bus of the bus system;

transmitting, using the transmitting stage, the transmit signal to a second bus wire of the bus; and damping, using an oscillation reduction module, an oscillation of a bus signal arising at terminals for the first and second bus wires when the transmitting/receiving device acts as a transmitter of the transmit signal, a first resistor of the oscillation reduction module being switched between the first bus wire and a terminal for ground, and a second resistor of the oscillation reduction module being switched between the second bus wire and a terminal for a voltage supply of the bus system.

12. A method for reducing oscillations of a bus differential voltage in a case of coupled-in interferences, the method being carried out using a transmitting/receiving device for a bus system, in which an exclusive, collision-free access of a user station to a bus of the bus system is at least temporarily ensured, the method comprising the following steps:

transmitting, using a transmitting stage of the transmitting/receiving device, a transmit signal to a first bus wire of a bus of the bus system;

transmitting, using the transmitting stage, the transmit signal to a second bus wire of the bus; and damping, using an oscillation reduction module for damping an oscillation of a bus signal arising at terminals for the first and second bus wires when the transmitting/receiving device acts as a transmitter of the transmit signal, a resistor of the oscillation reduction module being switched between the first bus wire and the second bus wire for damping the oscillation.

* * * * *